(12) United States Patent
Cai et al.

(10) Patent No.: US 11,755,959 B2
(45) Date of Patent: Sep. 12, 2023

(54) BINNING FOR NONLINEAR MODELING

(71) Applicant: PayPal, Inc., San Jose, CA (US)

(72) Inventors: Fan Cai, Shanghai (CN); Rongsheng Zhu, Shanghai (CN); Yingying Yu, Shanghai (CN)

(73) Assignee: PayPal, Inc., San Jose, CA (US)

( * ) Notice: Subject to any disclaimer, the term of this patent is extended or adjusted under 35 U.S.C. 154(b) by 1189 days.

(21) Appl. No.: 16/314,374

(22) PCT Filed: Dec. 12, 2018

(86) PCT No.: PCT/CN2018/120562
§ 371 (c)(1),
(2) Date: Dec. 28, 2018

(87) PCT Pub. No.: WO2020/118554
PCT Pub. Date: Jun. 18, 2020

(65) Prior Publication Data
US 2021/0232978 A1    Jul. 29, 2021

(51) Int. Cl.
*G06N 20/20*   (2019.01)
*G06N 5/01*    (2023.01)
*G06F 17/18*   (2006.01)

(52) U.S. Cl.
CPC ............... *G06N 20/20* (2019.01); *G06N 5/01* (2023.01); *G06F 17/18* (2013.01)

(58) Field of Classification Search
CPC ........ G06N 20/20; G06N 5/003; G06F 17/18; G06Q 40/025
See application file for complete search history.

(56) References Cited

U.S. PATENT DOCUMENTS 8,392,153 B2    3/2013  Pednault et al.
11,379,744 B1*  7/2022  Marino ................. G06N 5/003
(Continued)

FOREIGN PATENT DOCUMENTS

CN    106503745 A    3/2017
CN    106650615 A    5/2017
WO    WO 2017/210102 A1    12/2017

OTHER PUBLICATIONS

Ren, Shaoqing, et al. "Global refinement of random forest." Proceedings of the IEEE Conference on Computer Vision and Pattern Recognition. 2015. (Year: 2015).*

(Continued)

*Primary Examiner* — Michael J Huntley
*Assistant Examiner* — Sehwan Kim
(74) *Attorney, Agent, or Firm* — Haynes and Boone, LLP

(57) ABSTRACT

The systems, methods, and computer program products for determining bins for a data model are provided. Variables in a training data set are binned into bins up to a configurable number of bins. Variables in the validation data set are also binned using the bins from the training data set. A first decision tree is generated using the bins and the binned variables from the training data set and is pruned. A second decision tree is generated using the structure of the first decision tree and the binned variables from the validation data set. The first and second decision tree are merged into a third decision tree. Leaf nodes of the third decision tree are sorted and merged until weights of evidence associated with the training data set and the validation data set are monotonic. The bins for the data model are determined from the merged leaf nodes.

20 Claims, 11 Drawing Sheets

(56) References Cited

U.S. PATENT DOCUMENTS

| | | | |
|---|---|---|---|
| 2008/0172375 A1* | 7/2008 | Burges | G06F 16/334 707/999.005 |
| 2010/0198758 A1 | 8/2010 | Gupta et al. | |
| 2014/0257816 A1* | 9/2014 | Morinaka | G10L 13/02 704/260 |
| 2015/0286695 A1* | 10/2015 | Kadayam | G06F 16/27 707/639 |
| 2016/0210561 A1 | 7/2016 | Steinberg et al. | |
| 2018/0260531 A1 | 9/2018 | Nori et al. | |

OTHER PUBLICATIONS

Xu, Ming, Jianjun Ouyang, and Yunsen Huang. "A Natural Chinese speech Driven Mouth Animation System." 2007 Second International Conference on Communications and Networking in China. IEEE, 2007. (Year: 2007).*

Narsky, Ilya. "StatPatternRecognition: a C++ package for statistical analysis of high energy physics data." arXiv preprint physics/0507143 (2005). (Year: 2005).*

Sug, Hyontai. "Sampling scheme for better RBF network." Proceedings of the 2009 International Conference on Hybrid Information Technology. 2009. (Year: 2009).*

Extended European Search Report dated Nov. 19, 2021 from corresponding European application No. EP 18943009, 8 pages.

International Search Report and Written Opinion issued for International Application No. PCT/CN2018/120562, dated Sep. 18, 2019, 9 pages, ISA/CN.

* cited by examiner

500A

| leaf_index | dev_wgt_good | dev_wgt_bad | dev_woe | val_wgt_good | val_wgt_bad | val_woe | condition |
|---|---|---|---|---|---|---|---|
| 14 | 2886375 | 5241 | -1.687687 | 1506250 | 2980 | | 27.5 < BAD_SENT_TPV_t_ms3 <= 29.5 |
| 13 | 18761525 | 34459 | | 9757750 | 17136 | | 14.5 < BAD_SENT_TPV_t_ms3 <= 27.5 |
| 18 | 2507650 | 4722 | -1.651312 | 1302950 | 2325 | -1.687435 | 30.5 < BAD_SENT_TPV_t_ms3 |
| 17 | 1443175 | 2740 | -1.643086 | 756750 | 1396 | -1.654191 | 29.5 < BAD_SENT_TPV_t_ms3 <= 30.5 |
| 11 | 2886475 | 6582 | -1.459896 | 1489475 | 3215 | -1.497121 | 12.5 < BAD_SENT_TPV_t_ms3 <= 14.5 |
| 7 | 4329725 | 13820 | -1.123585 | 2270025 | 6878 | -1.157987 | 9.5 < BAD_SENT_TPV_t_ms3 <= 12.5 |
| 6 | 10103775 | 47075 | -0.745365 | 5295850 | 25346 | -0.700827 | 2.5 < BAD_SENT_TPV_t_ms3 <= 9.5 |
| 16 | 1443650 | 12477 | -0.127486 | 781975 | 5703 | -0.2796 | 1.5 < BAD_SENT_TPV_t_ms3 <= 2.5 |
| 15 | 11868850 | 134433 | 0.14295 | 6569500 | 58388 | -0.081852 | 0.5 < BAD_SENT_TPV_t_ms3 <= 1.5 |
| 1 | 15927350 | 446890 | 1.050077 | 8561300 | 245969 | 1.091429 | BAD_SENT_TPV_t_ms3 <= 0.5 |

FIG. 5A

| leaf_index | dev_wgt_good | dev_wgt_bad | dev_woe | val_wgt_good | val_wgt_bad | val_woe | condition |
|---|---|---|---|---|---|---|---|
| 27 | 2164900 | 39700 | -1.677755 | 1264000 | 20136 | | (leaf = 14) or (leaf = 13) |
| 18 | 2507650 | 4722 | | 1302950 | 2325 | | 30.5 < BAD_SENT_TPV_t_ms3 |
| 17 | 1443175 | 2740 | -1.643086 | 756750 | 1396 | -1.654191 | 29.5 < BAD_SENT_TPV_t_ms3 <= 30.5 |
| 11 | 2886475 | 6582 | -1.459896 | 1489475 | 3215 | -1.497121 | 12.5 < BAD_SENT_TPV_t_ms3 <= 14.5 |
| 7 | 4329725 | 13820 | -1.123585 | 2270025 | 6878 | -1.157987 | 9.5 < BAD_SENT_TPV_t_ms3 <= 12.5 |
| 6 | 10103775 | 47075 | -0.745365 | 5295850 | 25346 | -0.700827 | 2.5 < BAD_SENT_TPV_t_ms3 <= 9.5 |
| 16 | 1443650 | 12477 | -0.127486 | 781975 | 5703 | -0.2796 | 1.5 < BAD_SENT_TPV_t_ms3 <= 2.5 |
| 15 | 11868850 | 134433 | 0.14295 | 6569500 | 58388 | -0.081852 | 0.5 < BAD_SENT_TPV_t_ms3 <= 1.5 |
| 1 | 15927350 | 446890 | 1.050077 | 8561300 | 245969 | 1.091429 | BAD_SENT_TPV_t_ms3 <= 0.5 |

| leaf_index | dev_wgt_good | dev_wgt_bad | dev_woe | val_wgt_good | val_wgt_bad | val_woe | condition |
|---|---|---|---|---|---|---|---|
| 45 | 24155550 | 44422 | -1.674978 | 12566950 | 22461 | -1.685814 | (leaf =14) or (leaf = 13) or (leaf = 18) |
| 17 | 1443175 | 2740 | -1.643086 | 756750 | 1396 | -1.654191 | 29.5 < BAD_SENT_TPV_t_ms3 <= 30.5 |
| 11 | 2886475 | 6582 | -1.459896 | 1489475 | 3215 | -1.497121 | 12.5 < BAD_SENT_TPV_t_ms3 <= 14.5 |
| 7 | 4329725 | 13820 | -1.123585 | 2270025 | 6878 | -1.157987 | 9.5 < BAD_SENT_TPV_t_ms3 <= 12.5 |
| 6 | 10103775 | 47075 | -0.745365 | 5295850 | 25346 | -0.770827 | 5 < BAD_SENT_TPV_t_ms3 <= 9.5 |
| 16 | 1443650 | 12477 | -0.127486 | 781975 | 5703 | -0.2796 | 5 < BAD_SENT_TPV_t_ms3 <= 2.5 |
| 15 | 11868850 | 134433 | 0.14295 | 6569500 | 58388 | -0.081852 | 5 < BAD_SENT_TPV_t_ms3 <= 1.5 |
| 1 | 15927350 | 446890 | 1.050077 | 8561300 | 245969 | 1.091429 | AD_SENT_TPV_t_ms3 <= 0.5 |

Now, DEV & VAL must be consistent!

FIG. 5C

BINNING FOR NONLINEAR MODELING

CROSS-REFERENCE TO RELATED APPLICATIONS

This application is a U.S. National Stage Application under 35 U.S.C. § 371 of International Application No. PCT/CN2018/120562, filed on Dec. 12, 2018, the contents of which are incorporated herein by reference in its entirety.

TECHNICAL FIELD

This disclosure generally relates to data modeling, and more specifically to determining bins for non-linear data modeling, according to various embodiments.

BACKGROUND

Data binning frequently involves handling various data and sorting that data into discrete groups (e.g. bins). Data binning may be used in sorting data for modeling purposes, but depending on the type of model used, pre-existing approaches may offer sub-optimal performance.

BRIEF DESCRIPTION OF THE DRAWINGS

FIGS. 5A-5C are diagrams of tables that store data in leaf nodes of a decision tree, according to some embodiments.

Figure 1:
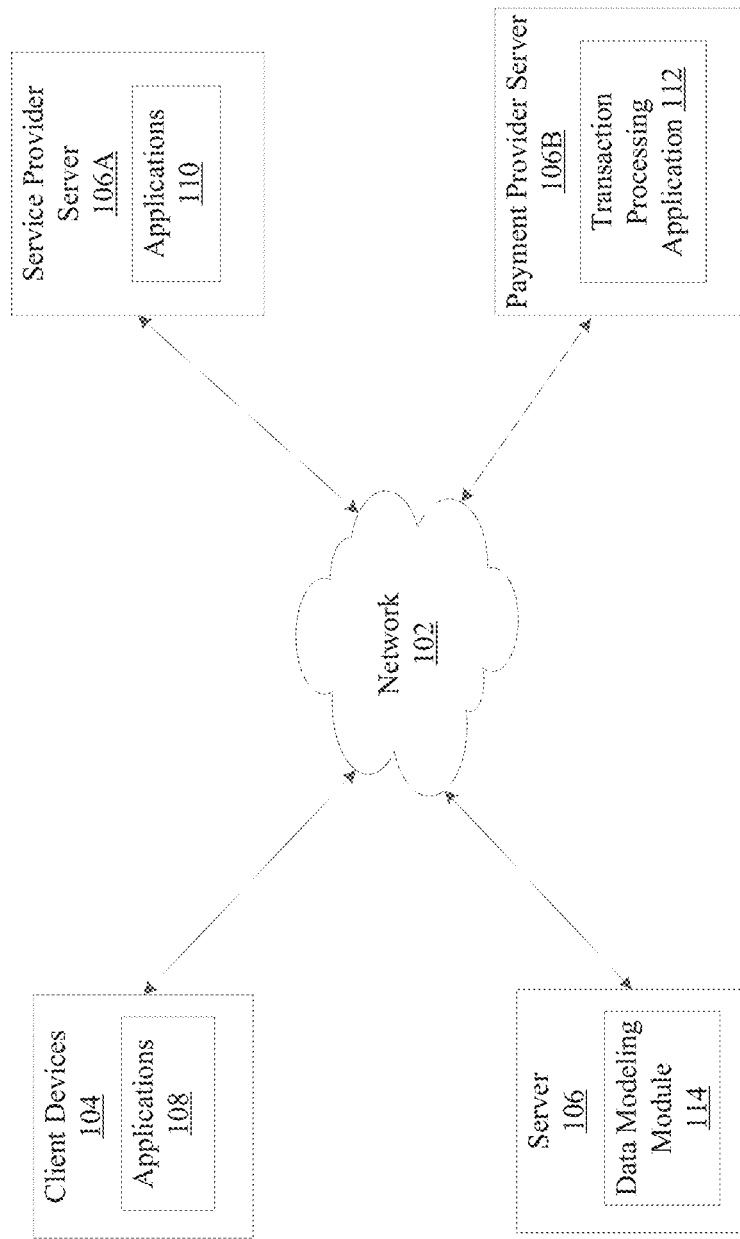
FIG. 1 is an exemplary system where embodiments can be implemented.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Data modeling systems may bin data that has continuous values into a smaller number of bins. A selection of a number (e.g. quantity) of bins and a bin range for each bin is often a manual process. Such manual selection may have several negative effects. For example, there may be too few or too many manually selected bins. Data modeling systems with too few or too many bins may either lose data or have data that is difficult to manage. In another example, bins that are allocated with equal bin range may have too many variables in some bins and too few in others. In another example, manually assigning ranges to bins may not guarantee consistency from bin to bin or only guarantee consistency among neighboring bins.

Embodiments that automatically determine bins for non-linear data models are provided. (Note: while various techniques, structures, etc. are described relative to nonlinear data models, the disclosure is not limited to use with such models and may be used with other models as well.) To determine bins for non-linear data models, a data modeling module may receive data. The data may include a training data set and a validation data set. The data modeling module may determine a number of bins, up to a configurable maximum number of bins, for the training data set. The data modeling module may also assign a variable range to the bins. The range may be in an ascending order for numeric bins or in an alphabetical order for categorical bins. The data modeling module may also assign a default bin for data that has missing values or for values outside of the numeric or categorical range of all bins. The data modeling module may also assign a numerical token, or an index to each bin.

In an embodiment, the data modeling module may receive raw data and use the raw data to determine the bins. Example raw data may include a training set and a variable set. The raw data may include linear or non-linear data.

In an embodiment, once the data modeling module divides data in the training data set into the bins, the data modeling module may generate a decision tree, such a binary split decision tree, using the bins and training data divided into the bins. To generate the decision tree, the data modeling module may use a Gini coefficient of inequality and/or entropy techniques, configure the depth of the decision tree, and prune and flatten the decision tree. In the decision tree, the leaf nodes may indicate the bin ranges or categories, the number of samples of a particular variable in the training set, the weight of evidence for the good and bad samples in the training set, etc.

In an embodiment, once the data modeling module generates the decision tree for the training data, the data modeling module may generate a decision tree for the validation data using the structure of the decision tree for the training data.

In an embodiment, the data modeling module may merge that decision tree for the training data and the decision tree for the validation data into a combined tree. As part of the merge, the data modeling module may configure the weight of evidence in the nodes of the tree and cap the weight of evidence to be between reconfigurable values.

In an embodiment, the data modeling module may merge the leaf nodes of the combined decision tree. To determine whether to merge the leaf nodes, the data modeling module may sort the data in the leaf nodes according to an ascending weight of evidence of the training data associated with the leaf node. Once the leaf nodes are sorted, the data modeling module may determine whether the weight of evidence for the associated variable data is monotonic. If the weight of evidence for the variable data is nonmonotonic, the data modeling module may merge the leaf node that includes the nonmonotonic weight of evidence with a preceding or subsequent leaf node. For example, if the weight of evidence of the validation data is less than the weight of evidence of the training data for the same leaf node, the data modeling module may merge the leaf node with a preceding leaf node from the sorted leaf nodes. In another example, if the weight of evidence of the validation data is higher than the weight of evidence for the training data in the same leaf node, the data modeling module may merge the leaf node with the following leaf node from the sorted leaf nodes.

In an embodiment, the data modeling module may continue to merge the leaf nodes until the weight of evidence for the training data in the sorted leaf nodes and the corresponding weight of evidence for the validation data are monotonic.

In an embodiment, the data modeling module may output the variable binning code from the merged leaf nodes. For example, the data modeling module may determine an information value of the training data and an information value of the validation data for each leaf node. The data modeling module may then output the variable binning code for the leaf node when the minimum value between the information value of the training data and the information value of the validation data is greater than 0.001 or some other predetermined threshold. In another example, the data modeling module may determine a population stability index of the training data and a population stability index of the validation data. The data modeling module may output the variable binning code for the leaf node when the maximum value between the population stability index of the training data and the population stability index of the validation data is less than 0.25 or some other predetermined threshold.

In an embodiment, the data modeling module may project the variable binning code to the value range of categories associated with the variables in the training data and/or validation data. The value range or categories associated with the variables are the ranges and categories for the bins that the data modeling module may use to bin the data.

FIG. 1 is an exemplary system 100 where embodiments can be implemented. System 100 includes a network 102, client devices 104, and servers 106. In an embodiment, network 102 may be implemented as a single network or a combination of multiple networks. For example, in various embodiments, network 102 may include the Internet or one or more intranets, landline networks, wireless networks, and/or other appropriate types of networks. Network 102 may be a small scale communication network, such as a private or local area network, or a larger scale network, such as a wide area network, accessible by the various components of system 100.

In an embodiment, client devices 104 may be portable and non-portable electronic devices under control of a user and configured to transmit, receive, and manipulate data received from different servers 106 over network 102. Example client devices 104 include desktop computers, laptop computers, tablets, smartphones, wearable computing devices, eyeglasses that incorporate computing devices, implantable computing devices, etc.

Client devices 104 may include one or more applications 108. Applications 108 may be pre-installed on the client devices 104, installed on the client devices 104 using portable memory storage devices, such as compact disks or thumb-drives, or be downloaded to the client devices 104 from servers 106. Applications 108 may execute on the client devices 104 and receive instructions and data from a user, and send and transmit instructions and data to servers 106.

In an embodiment, applications 108 may provide various services to users using client devices 104. Example applications 108 installed on client devices 104 may be payment transaction applications. Payment transaction applications may be configured to transfer money world-wide, receive payments for goods and services, manage money spending, etc. Further, applications 108 may be under an ownership or control of a payment service provider, such as PAYPAL®, Inc. of San Jose, Calif., USA, a telephonic service provider, a social networking service provider, and/or other service providers. In an embodiment, applications 108 may also be analytics applications. Analytics applications perform business logic, provide services, and measure and improve performance of services and functions of other applications that execute on client devices 104 based on current and historical data. In another embodiment, applications 108 may be security applications for implementing client-side security features, programmatic client applications for interfacing with appropriate application programming interfaces (APIs) over network 102. In yet another embodiment, applications 108 may be communication applications, such as email, texting, voice, and instant messaging applications that allow a user to send and receive emails, calls, texts, and other notifications through network 102. In yet another embodiment, applications 108 may be location detection applications, such as a mapping, compass, and/or global positioning system (GPS) application. In yet another embodiment, applications 108 may be social networking applications and/or merchant applications. In yet another embodiment, applications 108 may be service applications that permit a user of client device 104 to receive, request and/or view information for products and/or services, and also permit the user to purchase the selected products and/or services.

In an embodiment, applications 108 may utilize numerous components included in client devices 104 to display, receive input, store and transmit data, and communicate other client devices 104 and servers 106 over network 102. Example components are discussed in detail in FIG. 9.

In an embodiment, server 106 may be a computer device or a software program that provides functionality to other devices in network 102, such as client devices 104. In an embodiment, server 106 may serve multiple client devices 104. For example, server 106 may provide services and/or data to client devices 104, store data on behalf of client devices 104, etc. Example servers 106 may include service provider servers, payment provider servers, database servers, file servers, mail servers, print servers, application servers, game servers, etc. There may be hundreds or thousands of servers connected to network 102. Example service provider server 106a, payment provider server 106b, and database server 106c are described below.

In an embodiment, service provider server 106A may provide services to multiple applications 108 that execute on client devices 104. Service provider server 106A may also be maintained by a service provider, such as PAYPAL®, a telephonic service provider, social networking service, and/or other service providers.

In an embodiment, service provider server 106A executes applications 110. Applications 110 may receive, process, and transmit data for user requested products and/or services transmitted from client devices 104. Thus, applications 110 may be financial services applications configured to transfer money world-wide, receive payments for goods and services, manage money spending, etc. In an embodiment, applications 110 may also be security applications configured to implement client-side security features or programmatic client applications for interfacing with appropriate application programming interfaces (APIs) over network 102. In another embodiment, applications 110 may be communication applications that perform email, texting, voice, and instant messaging functions that allow a user to send and receive emails, calls, texts, and other notifications over network 102. In yet another embodiment, applications 110 may be location detection applications, such as a mapping, compass, and/or GPS applications. In yet another embodiment, applications 110 may also be incorporated into social networking applications and/or merchant applications.

In an embodiment, when applications 108 transmit requests and/or data to applications 110, applications 110 process the requests and data. In a further embodiment, applications 110 may request payment from a user using application 108 to process the requests. For example, application 110 may use payment provider server 106b to process the payment requests. The payment provider server 106B may receive payment requests from application 110 that causes the payment provider server 106B to transfer funds of a user using application 108 to service provider associated with the service provider server 106a.

In an embodiment, payment provider server 106B includes one or more transaction or payment processing applications 112. Payment processing applications 112 facilitate transfer of funds between one or more parties, or applications, such as applications 108 and 110. In an embodiment, payment processing applications 112 may be configured to receive information from one or more applications 108, 110 executing on client devices 104 and/or service provider server 106a for processing and completion of financial transactions. Financial transactions may include financial information corresponding to user debit/credit card information, checking account information, a user account (e.g., payment account with a payment provider server 106B), or other payment information. Transaction processing application 112 may complete the financial transaction for the purchase request by providing payment to application 110 executing on service provider server 106B. In various embodiments, transaction processing application 112 may provide transaction histories, including receipts, to client device 104 in order to provide proof of purchase for an item and/or service.

In an embodiment, data that is received by or from applications 108, 110, and/or 112 may be evaluated for fraud. Modeling data to expose inconsistencies may be one way to evaluate data for fraud. To model data, server 106 may include a data modeling module 114. Data modeling module 114 may model data using statistical modeling. In statistical modeling, data modeling module 114 may make statistical assumptions concerning a linear or non-linear sample data set and also a similar data set from a larger population. In an embodiment, the statistical assumptions may be modeled using a set of probability distributions. These probability distributions are assumed to approximate the distribution from which a particular data set may be sampled. In an embodiment, to generate a probability distribution, data modeling module 114 may divide data in a data set into multiple bins. The embodiments below discuss a novel, automated technique for dividing linear or non-linear data into bins.

Figure 2:
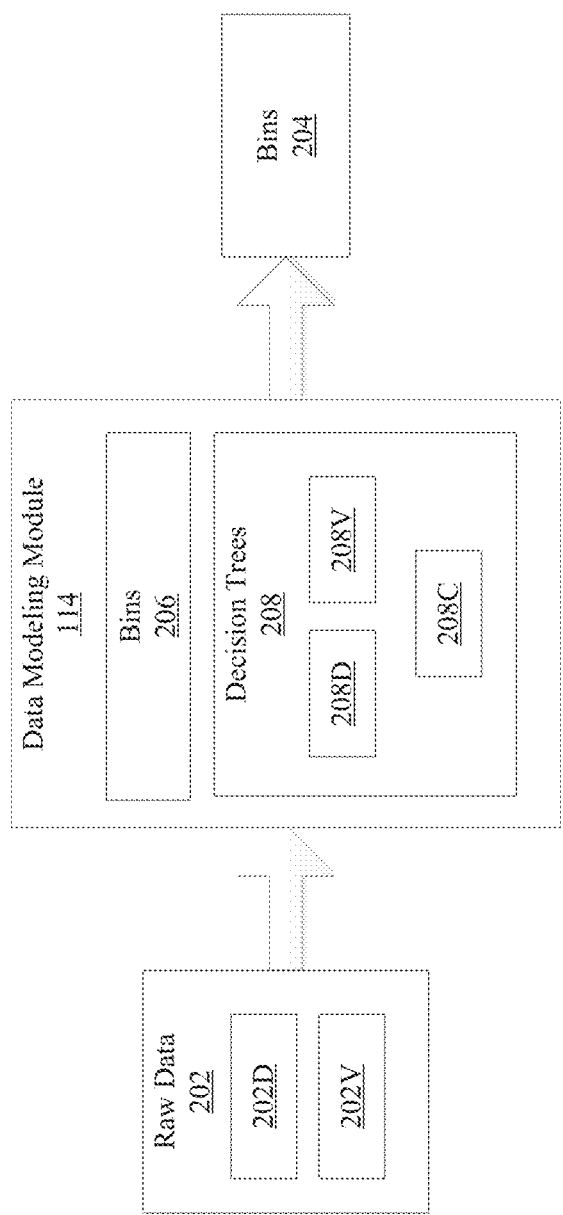
FIG. 2 is a block diagram of a data modeling module, according to some embodiments.

FIG. 2 is a block diagram 200 of a data modeling module, according to an embodiment. Data modeling module 114 may be implemented in Python or another software language, in some embodiments.

In an embodiment, data modeling module 114 may develop a data model that models one or more scenarios or transactions performed in, for example, system 100. To develop a data model, data modeling module 114 may use raw data 202 collected during a configurable time interval. In some embodiments, raw data 202 may be generated by transactions made by applications 108, 110 and/or 112. From raw data 202, data modeling module 114 may develop a data model by excluding missing and unique variables from raw data 202, binning and assigning the weight of evidence to different variables in raw data 202, keeping high contribution variables raw data 202, etc.

Figure 3:
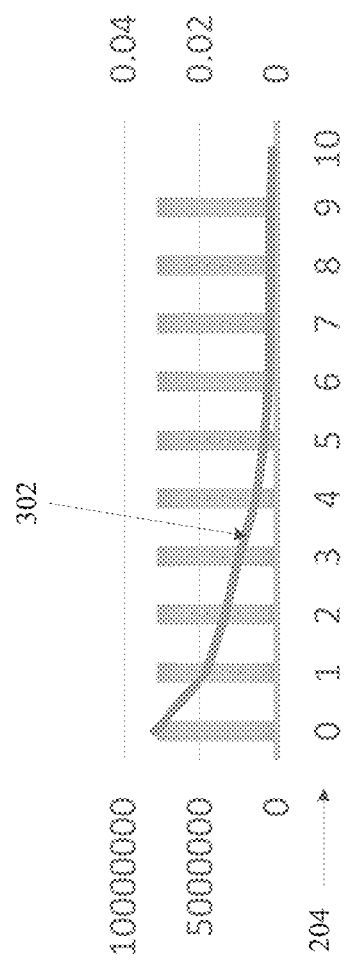
FIG. 3 is a diagram that with a data set binned into ten bins, according to some embodiments.

As discussed above, data modeling module 114 may develop a data model by grouping the variables included in raw data 202 into bins 204. Each bin 204 may include variables from raw data 202 that have values within a configurable range, values that are within a particular category, etc. For example, if raw data 202 includes values for an "age" category, bins 204 may store age values from 1-20 in a first bin, 20-29 in a second bin, 30-39 in a third bin, etc. FIG. 3 is a diagram 300 that illustrates a data set, such as raw data 202 binned into bins 204, such as bins 0 through 10, according to an embodiment. As illustrated in FIG. 3, bins 204 that are designated as 1 through 9 have approximately 7,500,000 counts of variables and bin 10 has zero counts. As also illustrated in FIG. 3, a bad rate 302 decreases from bin 0 to bin 10.

A conventional data modeling module may receive user input that manually sets the range or categories for each bin. That is, a conventional data modeling module may receive user input that sets age ranges from 1-20 to a first bin, 20-29 to a second bin, 30-39 to a third bin, etc. Unlike the conventional data modeling module that receives a user guess or manual entry for each bin range or category, data modeling module 114 may automatically determine the range or category for each bin 204 by statistically analyzing raw data 202.

Also conventional data modeling modules may require variables in the data to be monotonic. However, unlike conventional data modeling modules, data modeling module 114 may determine bins using non-monotonic and non-linear features of the variables. In this way, non-linear features of the variables can be tested and preserved instead of being removed from data modeling testing.

As discussed above, data modeling module 114 may automatically determine a number of bins 204 and the range or categories for each bin 204 that divides raw data 202. In some embodiments, data modeling module 114 may divide raw data 202 into bins 204 according to a weight of evidence. The weight of evidence may relate to a statistical technique that transfers numerical or categorical variable into a binned numerical variable to achieve conditional indicative likelihood ratio in terms of different bins 204. In some embodiments, a distinct weight of evidence may be assigned to each bin. In an embodiment, the weight of evidence for each bin 204, also referred as bin_woe, may be defined as:

$$\text{bin\_woe} = \ln\frac{P(\text{bad})}{P(\text{good})} = \ln\left(\frac{\text{bin\_bads/total\_bads}}{\text{bin\_goods/total\_goods}}\right) \begin{cases} \text{bin\_woe} = 0 \text{ when } P(\text{bad}) = P(\text{good}) \\ \text{bin\_woe} > 0 \text{ when } P(\text{bad}) > P(\text{good}) \\ \text{bin\_woe} < 0 \text{ when } P(\text{bad}) < P(\text{qood}) \end{cases}$$

In an embodiment, P(good) may be "possibility of good" and may be defined as a count of good data in raw data 202 over a total count of data in raw data 202, and P(bad) may be "possibility of bad" and may be defined as a count of bad data in raw data 202 over a total count of data in raw data 202. In a further embodiment, data modeling module 114 may define, for each model or for each bin 204, which observations in raw data 202 may be good and which may be bad. For some models, data modeling module 114 may define a transaction discussed in FIG. 1 as "bad" when there is a risk that the transaction would result in a monetary loss, otherwise, data modeling module 114 may define the transaction as a "good".

In an embodiment, data modeling module 114 may set a configurable maximum number of allowable bins to bins 204. For example, data modeling module 114 may bin raw data 202 into at most 100 bins 204.

As discussed above, data modeling module 114 may receive raw data 202. In some embodiments, raw data 202 may include multiple data sets, such as a training data set 202D and a validation data set 202V. Training data set 202D may be a reference data set that includes variables collected over a configurable period.

In an embodiment, to determine a number of bins, data modeling module 114 may divide data set 202D into temporary bins 206 or simply bins 206. Bins 206 may be bins that data modeling module 114 may later combine or remove, as will be discussed below. In an embodiment, the number of temporary bins 206 may also be less than the maximum number of bins. In a further embodiment, each bin 206 may include a variable range that is numeric in an ascending order, a variable range that is categorical by alphabetical order, where there may be one or more letters per bin, etc.

In an embodiment, data modeling module 114 may also generate a missing or default bin in bins 206. The missing or default bin may include variables that are outside of the variable or categorical range that spans bins 206. For example, if data modeling module 114 bins variables according to age values from values 1-20 to a first bin, values 20-29 to a second bin, and values 30-39 to a third bin, data modeling module 114 may bin the variables with values above 39 into a default fourth bin.

In an embodiment, data modeling module 114 may also assign a numerical token to each bin 206. For example, the missing or default bin in bins 206 may be assigned a token with a value of zero, and the rest of bins in bins 206 may be assigned a value of one through the maximum number of bins, such as 100. The numerical tokens may correspond to leaf indexes that are described below.

In an embodiment, once data modeling module 114 determines bins 206 and bins data set 202D into bins 206, data modeling module 114 may divide data set 202V into bins 206 that data modeling module 114 used to bin training data set 202D. In this way, data set 202V is divided into bin 206 according to ranges or categories that data modeling module 114 used to bin data set 202D.

In an embodiment, data modeling module 114 may generate one or more decision trees 208. Decision tree 208 may be a tree like structure that models decisions and possible consequences. In an embodiment, decision tree 208, may be a binary tree.

Figure 4:
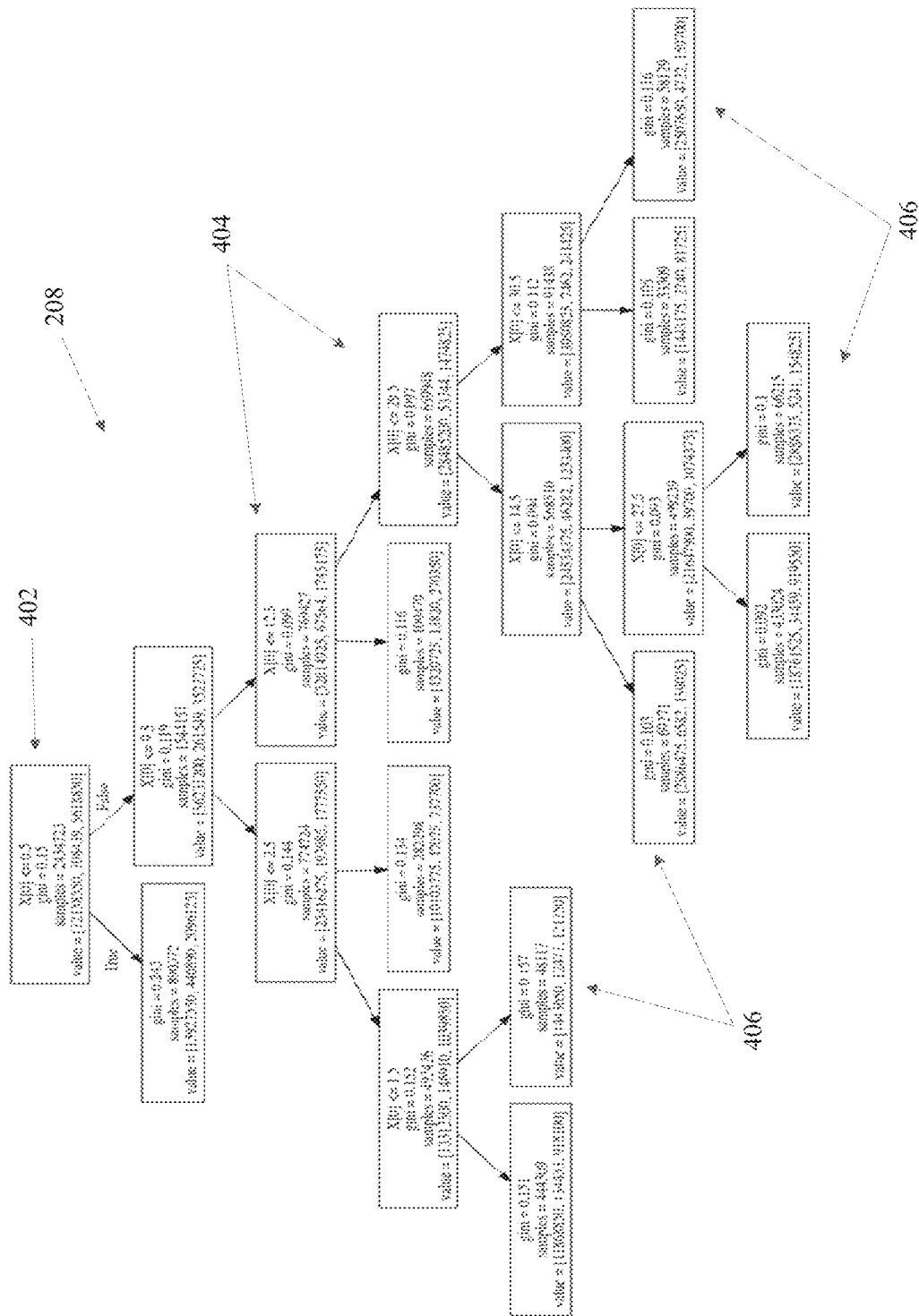
FIG. 4 is a diagram of a decision tree according to some embodiments.

FIG. 4 is a diagram 400 of a decision tree according to some embodiments. As illustrated in diagram 400, decision tree 208 may include a root node 402, internal nodes 404, and leaf nodes 406. In an embodiment, root node 402 may be a node that does not depend on any internal nodes 404 or leaf nodes 406. Root node 402 is typically the top most node. In an embodiment, internal nodes 404 may point to one or more leaf nodes 406 and be pointed to by root node 402 or other internal nodes 404. In an embodiment, leaf nodes 406 may be end nodes that are pointed to by root node 402 or internal nodes 404. In an embodiment, leaf nodes 406 may be the end nodes in decision tree 208 that do not point to other nodes. In an embodiment, root node 402 and internal nodes 404 may be decision nodes that may test a variable, while leaf nodes may include a predicted value of the variable.

Going back to FIG. 2, in an embodiment data modeling module 114 may generate decision trees 208 using a gini technique, entropy technique, information gain, etc. Gini may be a measure of how often a randomly chosen variable from the set of variables would be incorrectly labeled if the variable was randomly labeled according to the distribution labels in the subset. An example variable may be a variable from data set 202D that data modeling module 114 may use to generate bins 206. Entropy may be a measure of impurity, disorder, or uncertainty in raw data 202. In some embodiments, entropy may determine how decision trees 208 split raw data 202. Information gain may measure the amount of information that may be included in a variable in raw data 202. Typically, data modeling module 114 may build decision trees 208 that maximize information gain.

In an embodiment, data modeling module 114 may generate decision tree 208D. To generate decision tree 208D, data modeling module 114 may use bins 206 and data set 202D. In an embodiment, decision tree 208 illustrated in FIG. 4 may be decision tree 208D.

In an embodiment, data modeling module 114 may also limit the depth of decision trees 208. In some embodiments, the depth may be configurable, and in one example, may be five layers. To limit the depth of decision tree 208, data modeling module 114 may prune or flatten some of the layers in decision tree 208. In an embodiment, once data modeling module 114 generates decision tree 208D in FIG. 4 which has seven layers, data modeling module 114 may prune decision tree 208D to have five layers (not shown).

In an embodiment, data modeling module 114 may also generate decision tree 208V. To generate decision tree 208V, data modeling module 114 may apply the structure in decision tree 208D that has been pruned and flattened to data set 202V.

In an embodiment, data modeling module 114 may merge decision tree 208D and decision tree 208V into decision tree 208C. To merge decision tree 208D with decision tree 208V, data modeling module 114 may merge each node of decision tree 208D with the same node of decision tree 208V. Because data modeling module 114 generated decision tree 208V by applying bins 206 and data set 202V to decision tree 208D, the structure of decision tree 208V should be identical to the structure of decision tree 208D, in some embodiments.

In an embodiment, while generating decision trees 208D, 208V, and/or 208C, data modeling module 114 may limit or cap the value of the weight of evidence at each node. The weight of evidence may be limited to be between −5 and 5, in some embodiments.

In an embodiment, from each node in decision tree 208C, data modeling module 114 may determine a node index, weight of the good data in data set 202D, weight of the bad data in data set 202D, weight of evidence associated with the data set 202D, weight of the good data in data set 202V, weight of the bad data in data set 202V, weight of evidence of data set 202V, and a condition. In an embodiment, the node index may include leaf indexes of leaf nodes 406 and the condition may be a range or categories of each bin in bins 206D.

FIG. 5A is a diagram of a table 500A that illustrates data determined from leaf nodes in decision tree 208C, according to some embodiments. For example, FIG. 5A illustrates table 500A where each row represents data associated with leaf nodes 406 of decision tree 208C. As discussed above, each row may include a leaf index (leaf_index), a weight of good data in data set 202D (dev_wgt_good), a weight of bad data in data set 202D (dev_wgt_bad), a weight of evidence associated with data set 202D (dev_woe), a weight of good data in data set 202V (val_wgt_good), a weight of bad data in data set 202V (val_wgt_good), a weight of evidence of data set 202V (val_wgt_bad), and a condition.

In an embodiment, data modeling module 114 may determine a range or categories that span each bin in bins 206. To determine the range or categories for each bin in bins 206, data modeling module 114 may sort and combine the rows and hence leaf nodes 406 of decision tree 208C until the weight of evidence of data set 202D and the weight of evidence of data set 202V are monotonic and are increasing.

For example, data modeling module 114 may sort the rows according to the ascending weight of evidence determined from the variables in data set 202D. FIG. 5A illustrates table 500A with rows that data modeling module 114 had already sorted according to the ascending weight of evidence associated with the variables from data set 202D, according to an embodiment.

In an embodiment, once data modeling module 114 has sorted the rows according to the increasing weight of evidence associated with the variables in data set 202D, data modeling module 114 may determine if the weight of evidence associated with the variables in data set 202V is monotonic. Weight of evidence is monotonic when the weight of evidence continuously ascends from row to row. If the weight of evidence associated with the variables in data set 202V is not monotonic, data modeling module 114 may determine that data set 202D and data set 202V are mis-aligned from the weight of evidence perspective. A non-monotonic weight of evidence is illustrated in the first two rows of table 500A in FIG. 5A, column val_woe, where the weight of evidence of variables from data set 202V associated with leaf index 13 is lower than the weight of evidence of variables from data set 202V associated with leaf index 14, while the weight of evidence of variables from data set 202D, column dev_woe, associated with leaf index 13 is higher than the weight of evidence of variables from data set 202V associated with leaf index 14. In this case, data modeling module 114 may re-bin bins 206 by merging the rows, and hence leaf nodes 406. For example, if the weight of evidence for variables in data set 202V is less than the weight of evidence for variables in data set 202D for the non-monotonic row, then data modeling module 114 may merge the non-monotonic row with the higher row. In another example, if the weight of evidence for the variables in data set 202V is higher than the weight of evidence for the variables in data set 202D for the non-monotonic row, then data modeling module 114 may merge the non-monotonic row with the lower row. As illustrated with reference to table 500A in FIG. 5A, because val_woe=−1.702238 is less than dev_woe=−1.676236 for leaf index 13, data modeling module 114 may merge leaf index 13 with the upper leaf index 14, and hence leaf nodes 406 that correspond to the leaf indexes 13 and 14.

The merged leaf index 13 and leaf index 14 are illustrated in table 500B in FIG. 5B in the row with leaf index 27. In an embodiment, when data modeling module 114 merges two leaf nodes 406, data modeling module 114 may add the weights of good evidence for variables in data set 202D in the merged leaf nodes 406, add the weights of bad evidence for variables in data set 202D in the merged leaf nodes 406, recalculate the weight of evidence for the variables in data set 202D included in merged leaf nodes 406, add the weights of good evidence for variables from data set 202V in the merged leaf nodes 406, add the weights of bad evidence for variables from data set 202V in the merged leaf nodes 406, and recalculate the weight of evidence for the variables from data set 202V in the merged leaf nodes 406. This is illustrated in table 500A and 500B in FIG. 5B, where leaf node 406 associated with a leaf index 27 in the first row includes the merged data from leaf nodes 406 associated with the leaf indexes 13 and 14.

In an embodiment, data modeling module 114 may continue to merge leaf indexes until the weight of evidence associated with data set 202D and the weight of evidence associated with the data set 202V is monotonic. For example, as illustrated in FIG. 5B, the weight of evidence associated with data set 202V in leaf indexes 27 and 18 is not monotonic because val_woe=1.685627 for leaf index 27, while val_woe=−1.687435 for leaf index 18, while the weight of evidence associated with data set 202D in leaf indexes 27 and 28 is monotonic because dev_woe=−1.677755 for leaf index 27 and dcv_woe=−1.651312 for leaf index 18. Accordingly, data modeling module 114 may merge leaf nodes having leaf indexes 27 and 18 into a leaf node that corresponds to leaf index 45 as illustrated in table 500C in FIG. 5C, in some embodiments. As also illustrated in FIG. 5C, the weight of evidence of data set 202D and the weight of evidence of data set 202V is monotonic across all rows, and accordingly also all leaf nodes 406 in decision tree 208C.

As discussed above, the ranges or categories for bins 206 are illustrated in the condition column. Accordingly, in FIG. 5C, the condition column includes ranges for bins 206 for decision tree 208C. Further, in some embodiments, the condition column may include bin variable codes, as illustrated for the row with leaf index 45 that includes the condition for leaf indexes 14, 13, and 18. If traced through FIGS. 5A-5C, the condition for leaf nodes 14, 13, and 18 includes a bin range between 14.5 and 29.5.

In an embodiment, once the weight of evidence of data set 202D and the weight of evidence of data set 202V is monotonic across all rows, such as table 500C in FIG. 5C, data modeling module 114 may determine the variable binning codes for bins 206. To determine the variable binning codes, data modeling module 114 may output the variable binning code for a corresponding leaf node 406 when the minimum of the information value ("IV") of the variables in data set 202D for bin 206 and the variables in data set 202V for the same bin 206 is greater than 0.001 or Min(DEV IV, VAL IV)>0.001. In an embodiment, the IV may be defined:

$$IV = \Sigma \text{DistributionGood}_i - \text{DistributionBad}_i \times \text{WOE}_i$$

In another embodiment, data modeling module 114 may output the variable binning code for a corresponding leaf node 406 when the maximum of the popularity stability index ("PSI") of the variables in data set 202D for bin 204 and the variables in data set 202V is less than 0.25 or Max(DEV PSI, VAL PSI)<0.25. In an embodiment, the PSI may be defined as:

$$PSI = \sum \left( (\text{training data set \%} - \text{validation data set \%}) \times \left( \ln\left( \frac{\text{training data set \%}}{\text{validation data set \%}} \right) \right) \right)$$

In an embodiment, data modeling module 114 may rely on both IV and PSI to determine whether to output the variable binning code for the corresponding bin 206.

In an embodiment, bins 206 with the determined variable binning codes may be projected to the value ranges or categories that are included in each bin 204, which are an output of data modeling modules 114.

Figure 6:
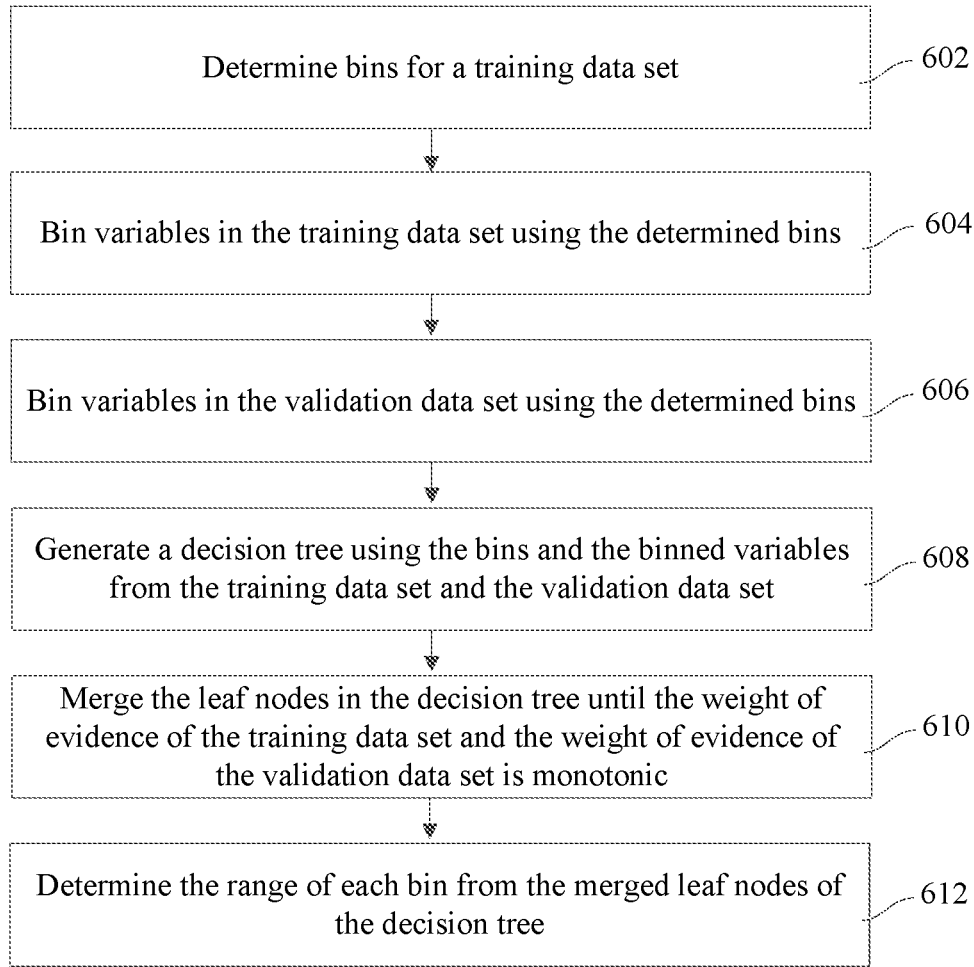
FIG. 6 is a flowchart of a method for automatically determining bins, according to some embodiments.

FIG. 6 is a flowchart of a method 600 for automatically determining bins, according to some embodiments. Method 600 may be performed using hardware and/or software components described in FIGS. 1-5. Note that one or more of the operations may be deleted, combined, or performed in a different order as appropriate.

At operation 602, bins for a data set are determined. For example, data modeling module 114 may determine bins 206, where each bin 206 may include variables from data set 202D. As discussed above, bins 206 may include variables from data set 202D by numeric or alphabetical order that fall within the range or category of the corresponding bin 206. As also discussed above, data modeling module 114 may generate bins 206 up to a maximum number of bins, allocate a default bin to bins 206, and assign numerical tokens to bins 206.

At operation 604, the data set is binned. For example, data modeling module 114 may bin variables in data set 202D according to the range or category allocated to each bin in bins 206.

At operation 606, the validation data set is binned. For example data modeling module 114 may bin data set 202D into bins 204.

At operation 608, a decision tree is generated. For example, data modeling module 114 may generate decision tree 208C that includes data from data set 202D and 202V, as discussed further in FIG. 7, below.

At operation 610, leaf nodes of a decision tree are merged. For example, data modeling module 114 may merge leaf nodes 406 unit, for sorted leaf nodes 406, the weight of evidence associated with the variables data set 202D and the weight of evidence associated with variables in data set 202V are monotonic.

At operation 612, the bins are determined. For example, data modeling module 114 may output the variable bin code for bins 206 when the minimum IV between the IV of the variables in data set 202D and IV of the variables in data set 202V for the corresponding bin 206 is greater than 0.001. In another example, data modeling module 114 may output the variable bin code for bins 206 when the maximum PSI between the variables in data set 202D and the variables in data set 202V for each bin 206 is less than 0.25. As discussed above, data modeling module 114 may trace the variable bin codes to the ranges or categories for each bin 206, and output bins 206 with the corresponding ranges or categories as bins 204.

Figure 7:
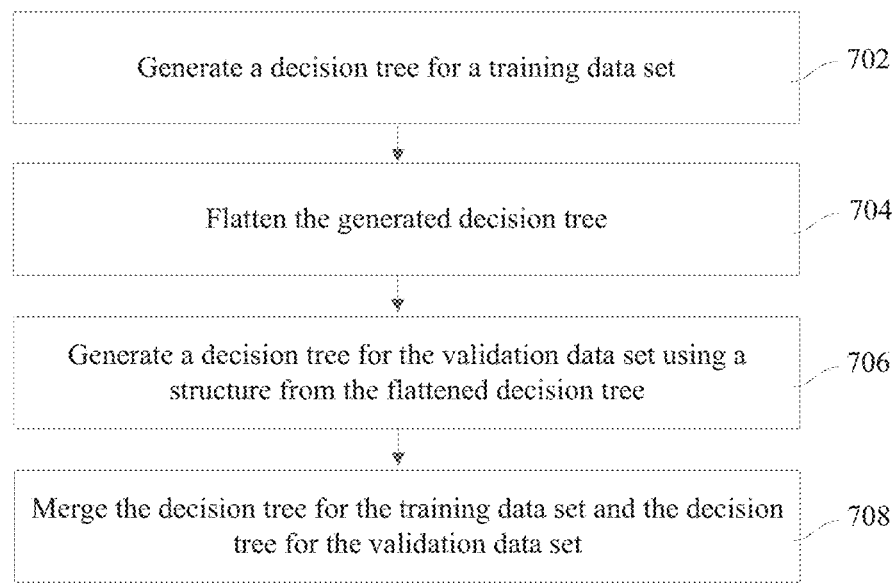
FIG. 7 is a flowchart of a method for generating a decision tree, according to some embodiments.

FIG. 7 is a flowchart of a method 700 for generating a decision tree, according to some embodiments. Method 700 may be performed using hardware and/or software components described in FIGS. 1-5. Note that one or more of the operations may be deleted, combined, or performed in a different order as appropriate.

At operation 702, a decision tree for a training data set is generated. For example, data modeling module 114 may generate decision tree 208D using bins 206 generated from data set 202D. As discussed above, data modeling module 114 may generate decision tree 208D using gini and/or entropy techniques.

At operation 704, a decision tree is flattened. For example, data modeling module 114 may prune and flatten decision tree 208D to have a configurable maximum depth, such as the depth that is five layers.

At operation 706, a decision tree for a validation data set is generated. For example, data modeling module 114 may generate decision tree 208V by applying validation data set 202V to the structure of the decision tree 208D that was pruned and flattened in operation 704.

At operation 708, nodes of the decision tree build using the training data set and nodes of the decision tree built using the validation data set are merged. As discussed above, data modeling module 114 may merge decision tree 208D and decision tree 208V into decision tree 208C. Because decision tree 208D and decision tree 208V may have the same structure, the merge may merge the corresponding nodes of decision tree 208D and 208V. While merging, data modeling module 114 may cap the weight of evidence for each node be within a configurable range, such as between −5 and 5.

Figure 8:
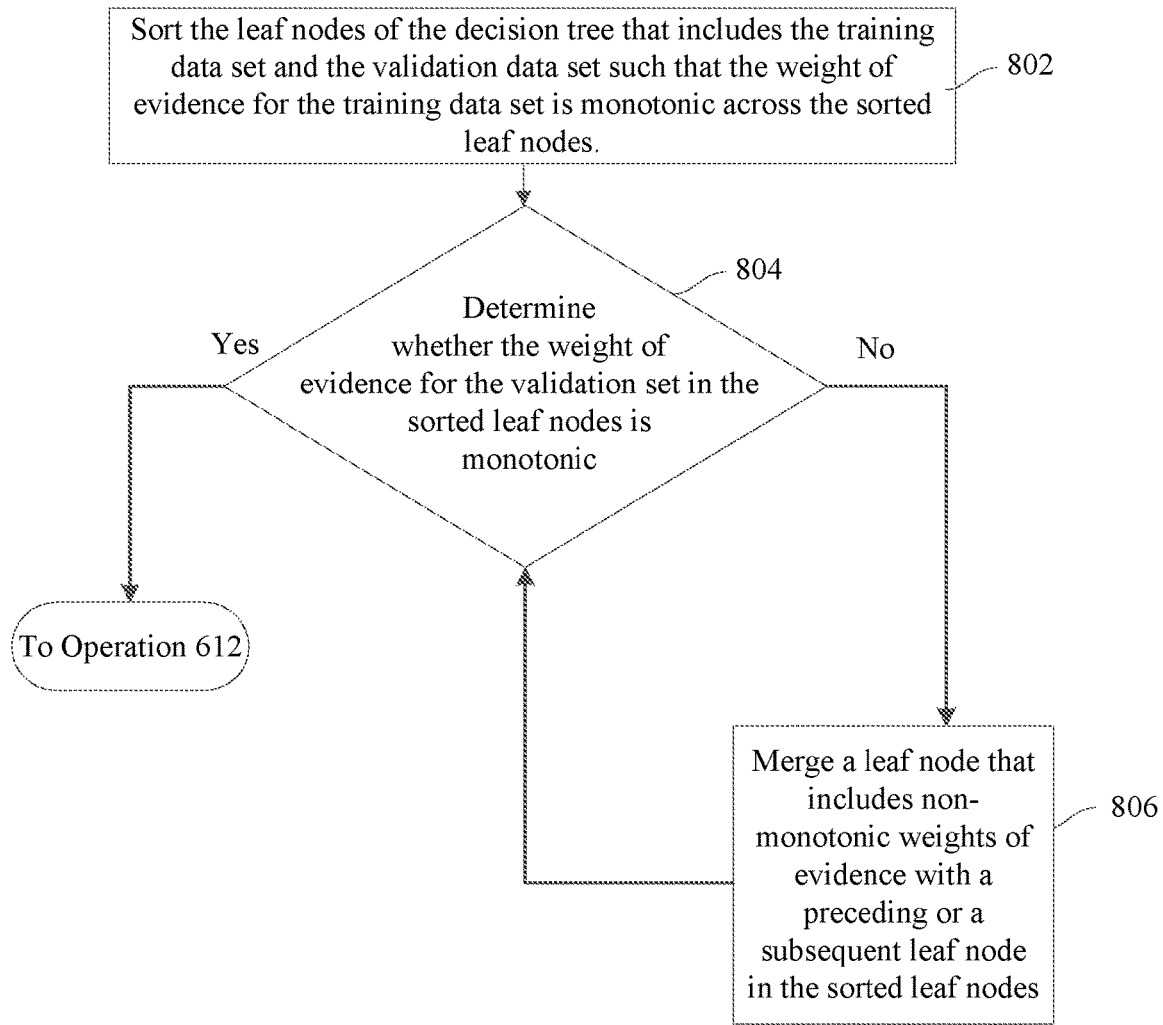
FIG. 8 is a flowchart of a method for determining bins from a decision tree, according to some embodiments.

FIG. 8 is a flowchart of a method 800 for determining bins from a decision tree, according to some embodiments. Method 800 may be performed using hardware and/or software components described in FIGS. 1-5. Note that one or more of the operations may be deleted, combined, or performed in a different order as appropriate.

At operation 802, a split decision tree is sorted. For example, data modeling module 114 may sort leaf nodes 406 of decision tree 208C such that the weight of evidence determined from the variables of data set 202D at leaf nodes 406 is monotonic.

At operation 804, a determination whether the weight of evidence of the variables in the validation data set is monotonic. For example, data modeling module 114 may determine whether the weight of evidence of variables from data set 202V in the sorted leaf nodes 406 is monotonic. If the weight of evidence of data set 202V is non-monotonic in one or more leaf nodes 406 sorted in operation 802, the flowchart proceeds to operation 806. Otherwise, when the weight of evidence of variables from data set 202D and the weight of evidence of variables from data set 202V in the sorted leaf nodes 406 are monotonic, method 800 proceeds to operation 612.

At operation 806, the leaf nodes with the non-monotonic weight of evidence of the validation data set are merged. For example, data modeling module 114 may merge leaf nodes 406 that have the non-monotonic weight of evidence of variables from data set 202V into a single leaf node 406. As discussed above, once leaf nodes 406 are merged, the condition that corresponds to the bin ranges or categories of the merged leaf nodes 406 is also merged. After the merge, method 800 may proceed to operation 804.

Figure 9:
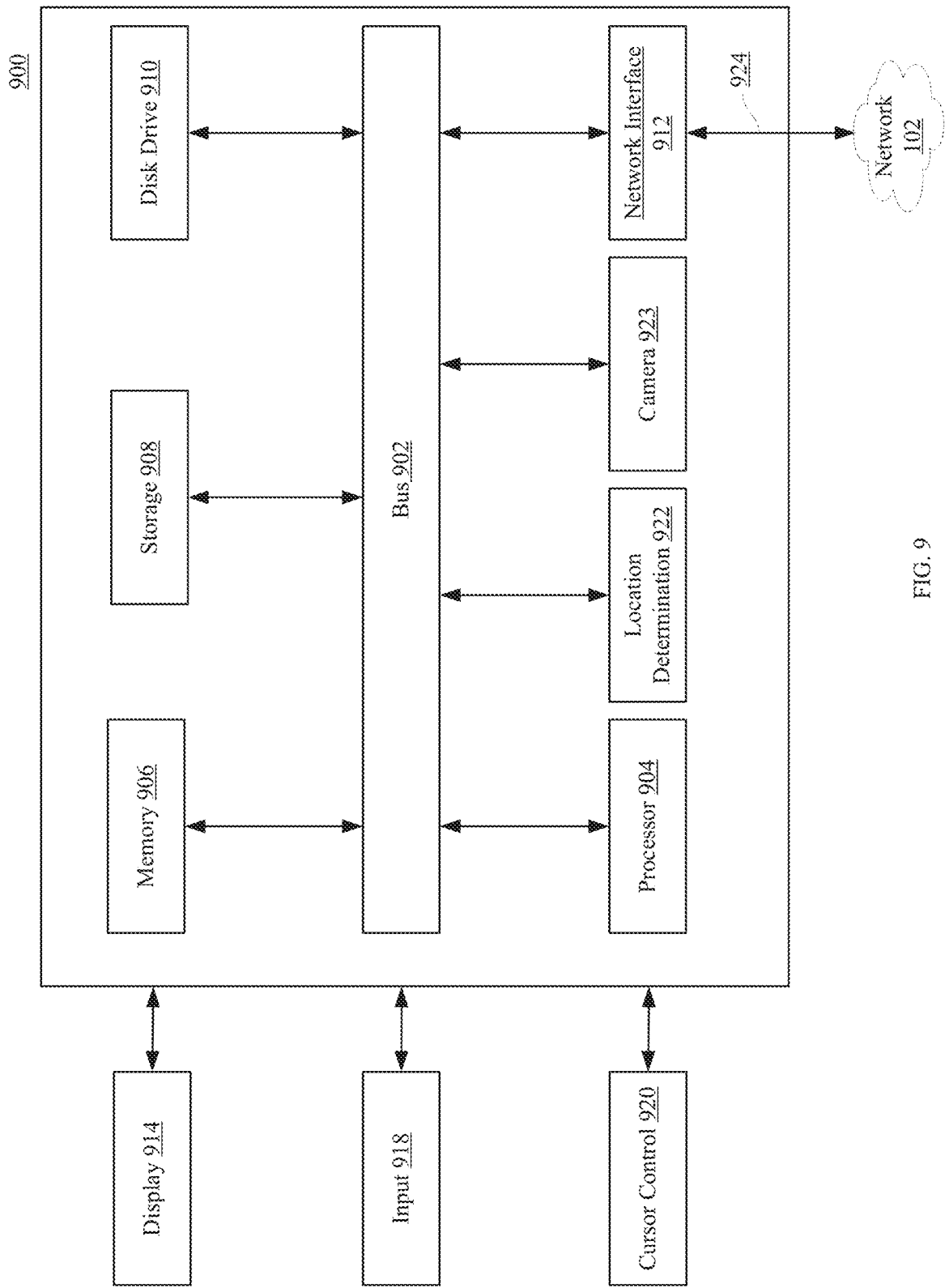
FIG. 9 is a block diagram of a computer system suitable for implementing one or more components in FIGS. 1-8, according to an embodiment.

Referring now to FIG. 9 an embodiment of a computer system 900 suitable for implementing, the systems and methods described in FIGS. 1-8 is illustrated.

In accordance with various embodiments of the disclosure, computer system 500, such as a computer and/or a server, includes a bus 902 or other communication mechanism for communicating information, which interconnects subsystems and components, such as a processing component 904 (e.g., processor, micro-controller, digital signal processor (DSP), graphics processing unit (GPU), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), a location determination component 922 (e.g., a Global Positioning System (GPS) device as illustrated, a cell tower triangulation device, and/or a variety of other location determination devices known in the art), and/or a camera component 923. In one implementation, the disk drive component 910 may comprise a database having one or more disk drive components.

In accordance with embodiments of the disclosure, the computer system 900 performs specific operations by the processor 904 executing one or more sequences of instructions contained in the memory component 906, such as described herein with respect to the mobile communications devices, mobile devices, and/or servers. Such instructions may be read into the system memory component 906 from another computer readable medium, such as the static storage component 908 or the disk drive component 910. In other embodiments, hard-wired circuitry may be used in place of or in combination with software instructions to implement the disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 900. In various other embodiments of the disclosure, a plurality of the computer systems 900 coupled by a communication link 924 to the network 102 (e.g., such as a LAN, WLAN, PTSN, and/or various other wired or wireless networks, including telecommunications, mobile, and cellular phone networks) may perform instruction sequences to practice the disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

What is claimed is:

1. A system, comprising:
    a non-transitory memory storing instructions; and
    one or more hardware processors coupled to the non-transitory memory and configured to read the instructions from the non-transitory memory to cause the system to perform operations comprising:
        determining a first plurality of bins for a training data set;
        binning variables in the training data set into the first plurality of bins;
        binning variables in a validation data set into the first plurality of bins;
        generating a decision tree using the first plurality of bins, the binned variables from the training data set, and the binned variables from the validation data set;
        merging leaf nodes of the decision tree until a weight of evidence associated with the training data set is monotonic and a weight of evidence associated with the validation data set is monotonic; and
        determining a second plurality of bins for a data model from the merged leaf nodes.

2. The system of claim 1, wherein a bin in the first plurality of bins for the training data set is a default bin that includes at least one variable that was not in a range corresponding to other bins in the first plurality of bins.

3. The system of claim 1, wherein binning the variables in the training data set further comprises:
    determining ranges for the first plurality of bins, wherein the ranges are in an ascending order, one range per one bin; and
    binning the variables into the first plurality of bins, wherein a variable is binned into a bin that corresponds to a range that includes the variable.

4. The system of claim 1, wherein generating the decision tree further comprises:

generating a first decision tree using the first plurality of bins and the binned variables from the training data set;
pruning the first decision tree to include up to a configurable number of layers;
generating a second decision tree using a structure of the pruned first decision tree and the binned variables from the validation data set; and
merging the first decision tree and the second decision tree into the decision tree.

5. The system of claim 1, wherein the operations further comprise:
limiting a weight of evidence associated with a subset of variables in the training data set at a leaf node from the leaf nodes to be below a configurable value.

6. The system of claim 1, wherein the operations further comprise:
limiting a weight of evidence associated with a subset of variables in the training data set at a leaf node from the leaf nodes to be above a configurable value.

7. The system of claim 1, wherein merging the leaf nodes of the decision tree further comprises:
sorting the leaf nodes in the decision tree according to an increasing weight of evidence associated with the training data set at each leaf node;
determining a first leaf node in the leaf nodes, wherein the first leaf node has a non-monotonic weight of evidence associated with the validation data set;
determining that the weight of evidence associated with the training data set at the first leaf node is lower than the weight of evidence associated with the validation data set at the first leaf node; and
merging the first leaf node with a second leaf node from the leaf nodes, wherein the second leaf node is a preceding leaf node and is associated with a lower weight of evidence for the training data set than the first leaf node.

8. The system of claim 1, wherein the operations further comprise:
sorting the leaf nodes in the decision tree according to an increasing weight of evidence associated with the training data set at each leaf node;
determining a first leaf node in the leaf nodes, wherein the first leaf node has a non-monotonic weight of evidence associated with the validation data set;
determining that the weight of evidence associated with the training data set at the first leaf node is higher than the weight of evidence associated with the validation data set at the first leaf node; and
merging the first leaf node with a second leaf node from the leaf nodes, wherein the second leaf node is a succeeding leaf node and is associated with a higher weight of evidence for the training data set than the first leaf node.

9. A method, comprising:
binning variables in a training data set into a first plurality of bins;
binning variables in a validation data set into the first plurality of bins;
generating a decision tree based on the first plurality of bins, the binned variables from the training data set, and the binned variables from the validation data set;
sorting leaf nodes in the decision tree;
merging the leaf nodes of the decision tree until a weight of evidence associated with the training data set is monotonic in the sorted leaf nodes and a weight of evidence associated with the validation data set is monotonic in the sorted leaf nodes; and
determining a second plurality of bins for a data model from the merged leaf nodes.

10. The method of claim 9, wherein binning the variables in the training data set further comprises:
determining categories for the first plurality of bins, wherein the categories are in alphabetical order, at least one letter in the alphabet per one bin; and
binning the variables into the first plurality of bins, wherein a variable is binned into a bin that corresponds to a letter associated with the variable and the bin.

11. The method of claim 9, further comprising,
generating a default bin in the first plurality of bins; and
binning a subset of variables in the training data set into the default bin, wherein the subset of variables includes variables in the training data set that are outside of a range of each bin in the first plurality of bins.

12. The method of claim 9, wherein generating the decision tree further comprises:
generating a first decision tree using the first plurality of bins and the binned variables from the training data set;
pruning the first decision tree to include up to a configurable number of layers;
generating a second decision tree using a structure of the pruned first decision tree and the binned variables from the validation data set; and
merging the first decision tree and the second decision tree into the decision tree.

13. The method of claim 9, wherein merging the leaf nodes further comprises:
sorting the leaf nodes according to an increasing weight of evidence associated with the training data set at each leaf node;
determining a first leaf node with a non-monotonic weight of evidence associated with the validation data set;
determining the weight of evidence associated with the training data set at the first leaf node is lower than the weight of evidence associated with the validation data set at the first leaf node; and
merging the first leaf node with a second leaf node from the leaf nodes, wherein the second leaf node is associated with a lower weight of evidence for the training data set than the first leaf node.

14. The method of claim 9, wherein determining the second plurality of bins for the data model further comprises:
for each leaf node:
determining that a minimum between an information value associated with a subset of variables in the training data set and an information value associated with a subset of variables in the validation data set is below a configurable threshold; and
adding a bin associated with a leaf node to the second plurality of bins for the data model based on the determining.

15. The method of claim 9, wherein determining the second plurality of bins for the data model further comprises:
for each leaf node:
determining that a maximum between a population stability index associated with a subset of variables in the training data set and a population stability index associated with a subset of variables in the validation data set is below a configurable threshold; and
outputting a variable bin code for a bin in the second plurality of bins based on the determining.

16. The method of claim 15, further comprising:
determining a value range for the bin from the variable bin code.

17. The method of claim 15, further comprising:
determining a category for the bin from the variable bin code.

18. A non-transitory machine-readable medium having stored thereon machine-readable instructions executable to cause a machine to perform operations comprising:
determining a first plurality of bins for a training data set;
binning variables in the training data set into the first plurality of bins;
binning variables in a validation data set into the first plurality of bins;
generating a first decision tree using the first plurality of bins and the binned variables from the training data set;
generating a second decision tree using the first plurality of bins and the binned variables from the validation data set;
merging the first decision tree and the second decision tree into a third decision tree;
merging leaf nodes of the third decision tree until a weight of evidence associated with the training data set is monotonic and a weight of evidence associated with the validation data set is monotonic; and
determining a second plurality of bins for a data model from the merged leaf nodes.

19. The non-transitory machine-readable medium of claim 18,
wherein the operations further comprise:
sorting the leaf nodes in the third decision tree according to an increasing weight of evidence associated with the training data set at each leaf node;
determining a first leaf node with a non-monotonic weight of evidence associated with the validation data set;
determining, using a weight of evidence associated with the training data set at the first leaf node a second leaf node from the sorted leaf nodes to be merged with the first leaf node; and
merging the first leaf node with the second leaf node from the leaf nodes.

20. The non-transitory machine-readable medium of claim 19, wherein the second leaf node is a preceding leaf node or a subsequent leaf node to the first leaf node in the sorted leaf nodes.

* * * * *